(12) United States Patent
Scholz et al.

(10) Patent No.: US 6,651,509 B2
(45) Date of Patent: Nov. 25, 2003

(54) MECHANISM FOR DIFFERENTIAL PRESSURE MEASUREMENT WITH REMOVABLE DIFFERENTIAL PRESSURE SENSOR

(75) Inventors: Wolfgang Scholz, Minden (DE); Albrecht Vogel, Stutensee (DE); Peter Krippner, Karlsruhe (DE); Manfred Wetzko, Wilhelmsfeld (DE)

(73) Assignee: ABB Patent GmbH, Mannheim (DE)

( * ) Notice: Subject to any disclaimer, the term of this patent is extended or adjusted under 35 U.S.C. 154(b) by 0 days.

(21) Appl. No.: 10/172,236

(22) Filed: Jun. 14, 2002

(65) Prior Publication Data

US 2003/0005773 A1 Jan. 9, 2003

(30) Foreign Application Priority Data

Jul. 7, 2001 (DE) .................................... 201 11 343 U

(51) Int. Cl.$^7$ ................................................ G01L 7/00
(52) U.S. Cl. ....................................................... 73/756
(58) Field of Search ......................... 73/706, 715–727, 73/756

(56) References Cited

U.S. PATENT DOCUMENTS

| 4,034,610 A | * | 7/1977 | Biddle et al. ................. 73/725 |
| 4,475,405 A | * | 10/1984 | Corpron et al. ........... 73/861.24 |
| 5,050,634 A | * | 9/1991 | Fiechtner .................... 137/486 |

\* cited by examiner

Primary Examiner—William Oen
(74) Attorney, Agent, or Firm—Michael M. Rickin

(57) ABSTRACT

There is disclosed a measurement mechanism for differential pressure measurement. The mechanism has two housing portions with flanges. A differential pressure sensor is force-fit between the two flange faces. An electronics board is connected to the differential pressure sensor by means of a force-fit electrical contact.

14 Claims, 1 Drawing Sheet

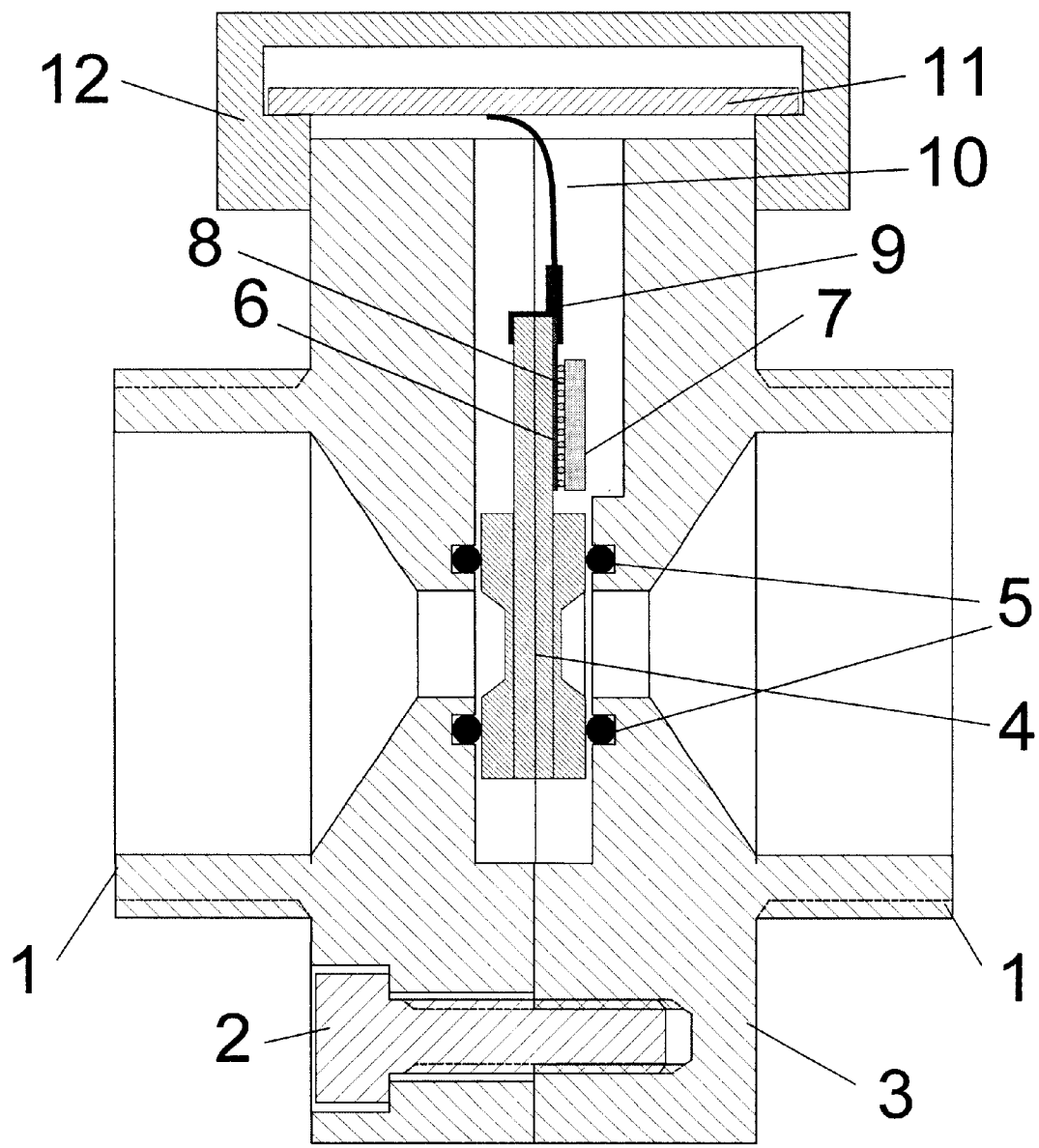

MECHANISM FOR DIFFERENTIAL PRESSURE MEASUREMENT WITH REMOVABLE DIFFERENTIAL PRESSURE SENSOR

FIELD OF THE INVENTION

This invention relates to the field of differential pressure measurement and more particularly to a measurement mechanism for differential pressure measurement.

DESCRIPTION OF THE PRIOR ART

Measurement mechanisms for differential pressure measurement are typically based on a differential pressure measurement cell, which is produced in silicon-glass micromechanics and has an elaborate external arrangement for limiting the maximum differential pressure. A technical difficulty in this case involves, in particular, the pressure-tight connection of the measurement cell to the pressure feed. This is typically achieved by means of connecting pieces soldered or anodically bonded onto the silicon. Via this connecting piece, the pressure is fed from outside to the sensor, which is located in a small metal housing. This generally requires a plurality of connection points, which have to be welded or soldered.

The resulting multiplicity of soldered connections leads to a technically demanding fabrication process. Furthermore, soldered connections hinder straightforward repair of the measurement mechanism by replacing the sensor cell in the event of a fault.

The measurement mechanism itself takes care of pressure limitation by means of an oil store and a plurality of diaphragms. It likewise forms the interface with the macroscopic environment, in particular the flanges of a pipeline. The oil store also makes it more difficult to repair the measurement mechanism.

It is therefore object of the invention to provide a measurement mechanism those structure permits straightforward repair by replacing the sensor cell in the event of a fault. The present invention achieves that object.

SUMMARY OF THE INVENTION

The invention is based on a measurement mechanism for differential pressure measurement, which essentially consists of two housing portions, an electronics board and a differential pressure sensor.

According to the invention, the housing portions are designed in flange form, and the differential pressure sensor is inserted with a force-fit between the flange faces of the housing portions. The electronics board is connected to the differential pressure sensor via a force-fit electrical contact.

The effect advantageously achieved by this is that, after the housing has been opened and the force-fit electrical connection to the electronics board has been disconnected, the differential pressure sensor can be removed and replaced without the need for further aids and instruments, in particular soldering tools. Since the inner housing and the oil store are omitted without being replaced, the differential pressure sensor can be replaced directly and in situ. The fact that the differential pressure sensor is clamped between the housing portions increases the pressure resistance of the differential pressure sensor.

According to another feature of the invention, the faces of the differential pressure sensor that touch the flange faces of the housing portions are respectively separated by a seal.

This improves the sealing action between the differential pressure sensor and the housing portions, in particular at high pressures.

According to another feature of the invention, the seal is formed by an O-ring. Straightforward and cost-effective sealing is thereby achieved.

According to another feature of the invention, the seal is formed by a metallic layer which is electrolytically applied to the surface of the side of the differential pressure sensor pointing toward each flange face of the housing portions.

DESCRIPTION OF THE DRAWING

The only drawing FIGURE shows one embodiment for the measurement mechanism for differential pressure measurement of the present invention.

DESCRIPTION OF THE PREFERRED EMBODIMENT(S)

The invention will be explained in more detail below with reference to an exemplary embodiment shown in the only drawing FIGURE. The single FIGURE shows a sectional representation through a measurement mechanism for differential pressure measurement, which essentially consists of two housing portions 3, an electronics board 11 and a differential pressure sensor 4.

The housing portions 3 are designed in flange form, and are respectively equipped with a pipe adaptor 1. The flange faces point toward one another and have recesses for holding the differential pressure sensor 4. The housing portions 3 are connected to one another by screws 2.

The differential pressure sensor 4 is inserted with a force-fit between the flange faces of the housing portions 3. In this case, the differential pressure sensor 4 is clamped, by means of the screw connection between the housing portions 3, between the flange faces of the housing portions 3. This assembly technique reinforces the pressure resistance of the differential pressure sensor 4 in the measurement mechanism.

The faces of the differential pressure sensor 4 that touch the flange faces of the housing portions 3 are respectively separated by a seal 5. According to the representation in the FIGURE, the seal 5 is formed by an O-ring. Alternatively, the seal 5 may be formed by a metallic layer which is electrolytically applied to the surface of the side of the differential pressure sensor 4 pointing toward each flange face of the housing portions 3.

The differential pressure sensor 4 has a support plate with conductor tracks 6, which is equipped with an electronic circuit 7 for pre-processing the sensor signals of the differential pressure sensor 4. The electronic circuit 7 is made as a physical component in a circuit. This circuit is preferably connected by flip-chip bond technology to the conductor tracks 6 of the support plate. Alternatively, the circuit may be connected by wire bond technology to the conductor tracks 6 of the support plate. In another embodiment, the circuit may be connected by conductive adhesive to the conductor tracks 6 of the support plate.

The support plate of the differential pressure sensor 4 is connected with a force-fit via a ribbon cable 10 to the electronics board 11. Preferably, the ribbon cable 10 is equipped with a clamp connector 9, which can be fitted onto the support plate of the differential pressure sensor 4. Alternatively, the ribbon cable 10 may be connected by conductive rubber to the conductor tracks 6 on the support plate. In another embodiment, the ribbon cable 10 may be joined via a polymeric molded part with integrated conductor track structures and optionally contained electronics components, a so-called MID (molded interconnection device) to the conductor tracks 6 on the support plate. A common feature of all the embodiments is that the connection between the ribbon cable 10 and the conductor tracks 6 on the support plate can be disconnected.

The electronics board 11 is fitted in a cap-type electronics housing 12.

The effect advantageously achieved by the force-fitting of sensor 4 between the flange faces of the housing portions 3 and the force-fit of board 11 to sensor 4 is that, after the housing 12 has been opened and the force-fit electrical connection to the electronics board 11 has been disconnected, the differential pressure sensor 4 can be removed and replaced without the need for further aids and instruments, in particular soldering tools. Since the inner housing and the oil store are omitted without being replaced, the differential pressure sensor 4 can be replaced directly and in situ.

Furthermore, the measurement mechanism according to the invention has a small number of individual components with a straightforward structure and is therefore cost-effective to fabricate.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A measurement mechanism for differential pressure measurement comprising:
   a. two housing portions each having flange faces, said flange faces defining a fluidless cavity between said housing portions;
   b. a differential pressure sensor inserted in said cavity with a force fit between said flange faces of said two housing portions; and
   c. an electronics board connected to said differential pressure sensor by means of a force-fit electrical contact.

2. The measurement mechanism of claim 1, wherein the faces of the differential pressure sensor that touch the flange faces of said housing portions are respectively separated by a seal.

3. The measurement mechanism of claim 2, wherein said seal is formed by an O-ring.

4. The measurement mechanism of claim 2, wherein said seal is formed by a metallic layer which is electrolytically applied to the surface of the side of said differential pressure sensor pointing toward each flange face of said housing portions.

5. The measurement mechanism of claim 1 further comprising a cap type housing fitted on said two housing portions, said electronics board fitted in said cap type housing.

6. The measurement mechanism of claim 1 wherein said two housing portions are connected to each other by one or more screws.

7. The measurement mechanism of claim 1 wherein the faces of said differential pressure sensor that touch the flange faces of said housing portions are respectively separated by a seal that is formed by a metallic layer which is electrolytically applied to the surface of the side of the differential pressure sensor pointing toward each flange face of said housing portions.

8. The measurement mechanism of claim 1 wherein said differential pressure sensor has a support plate.

9. The measurement mechanism of claim 8 wherein said electronics board is connected by said force-fit electrical contact to said support plate.

10. The measurement mechanism of claim 8 wherein said support plate has conductor tracks and said force-fit electrical contact is connected to said conductor tracks.

11. The measurement mechanism of claim 8 wherein said support plate has conductor tracks for connection to an electronic circuit for pre-processing the sensor signals of said differential pressure sensor.

12. The measurement mechanism of claim 1 wherein said two housing portions are releasably connected to each other.

13. A mechanism for differential pressure measurement comprising:
   a. two housing portions each having flange faces, said flange faces defining a cavity between said housing portions, said cavity having a absence of an incompressible fluid therein;
   b. a differential pressure sensor inserted in said cavity with a force fit between said flange faces of said two housing portions; and
   c. an electronics board connected to said differential pressure sensor by mean of a force-fit electrical contact.

14. The measurement mechanism of claim 13 wherein said two housing portions are releasably connected to each other.

* * * * *